United States Patent [19]

Hartmann et al.

[11] Patent Number: 5,753,759

[45] Date of Patent: May 19, 1998

[54] GRAFT POLYMERS CONTAINING N-VINYL UNITS, THEIR PREPARATION AND THEIR USE

[75] Inventors: Heinrich Hartmann, Limburgerhof; Walter Denzinger, Speyer; Claudia Nilz, Rödersheim-Gronau, all of Germany

[73] Assignee: Basf Aktiengesellschaft, Ludwigshafen, Germany

[21] Appl. No.: 704,772

[22] PCT Filed: Mar. 3, 1995

[86] PCT No.: PCT/EP95/00912

§ 371 Date: Oct. 24, 1996

§ 102(e) Date: Oct. 24, 1996

[87] PCT Pub. No.: WO95/25759

PCT Pub. Date: Sep. 28, 1995

[30] Foreign Application Priority Data

Mar. 23, 1994 [DE] Germany .................. 44 09 903.7

[51] Int. Cl.[6] .................................................. C08F 271/00
[52] U.S. Cl. .................. 525/218; 525/262; 525/278; 525/279; 525/296
[58] Field of Search ................... 525/218, 296, 525/278, 279, 262

[56] References Cited

U.S. PATENT DOCUMENTS

| | | | |
|---|---|---|---|
| 4,970,342 | 11/1990 | Fauss et al. | 564/393 |
| 5,225,088 | 7/1993 | Moench et al. | 210/734 |
| 5,324,787 | 6/1994 | Pinschmidt et al. | 525/328.2 |
| 5,334,287 | 8/1994 | Hartmann et al. | 162/175 |
| 5,373,065 | 12/1994 | Kitazawa et al. | 525/382 |
| 5,543,459 | 8/1996 | Hartmann et al. | 525/54.3 |
| 5,578,678 | 11/1996 | Hartmann et al. | 525/54.3 |

FOREIGN PATENT DOCUMENTS

| | | |
|---|---|---|
| 0071050 | 3/1985 | European Pat. Off. |
| 0337310 | 4/1989 | European Pat. Off. |
| 0251182 | 11/1991 | European Pat. Off. |
| 0216387 | 1/1993 | European Pat. Off. |
| 9528409 | 5/1996 | European Pat. Off. |
| 4322854 | 7/1993 | Germany. |
| 84/03312 | 2/1984 | Japan. |
| 84/039399 | 3/1984 | Japan. |
| WO 82/02073 | 6/1982 | WIPO. |

*Primary Examiner*—Joseph L. Schofer
*Attorney, Agent, or Firm*—Oblon, Spivak, McClelland, Maier & Neustadt, P.C.

[57] ABSTRACT

Graft polymers which contain N-vinyl units and in which the grafting base is a polymer which contains in each case at least 5% by weight of units of the formulae

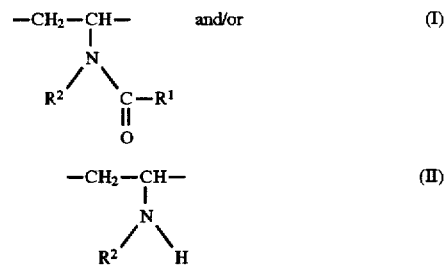

where $R^1$ and $R^2$ are each H or $C_1$-$C_6$-alkyl, monoethylenically unsaturated monomers are grafted onto the grafting base in a weight ratio of from 100:1 to 1:100, and which have K values of at least 7 (determined according to H. Fikentscher in 5% strength by weight aqueous solution at 25° C. and pH 7), are prepared by polymerization of monoethylenically unsaturated monomers in the presence of polymers which in each case contain at least 5% by weight of units of the formulae I and/or II as the grafting base in a weight ratio of from 100:1 to 1:100, and are used as dispersants for pigments, as additives for detergents and cleaning agents, and strength agents for paper and as soil stabilizers and for fertilizer compaction.

10 Claims, No Drawings

GRAFT POLYMERS CONTAINING N-VINYL UNITS, THEIR PREPARATION AND THEIR USE

The present invention relates to graft polymers which contain N-vinyl units and have monoethylenically unsaturated monomers grafted onto polymers containing vinylamine and/or open-chain N-vinylamide units, processes for their preparation and their use as dispersants, as additives for detergents and cleaning agents, as strength agents for paper and as soil stabilizers.

EP-B-0 071 050 discloses linear, basic polymers which contain polymerized vinylamine and vinylformamide units. These polymers are prepared by homopolymerization of N-vinylformamide and subsequent partial elimination of formyl groups by the action of acids or bases, and are used as drainage aids and retention aids in papermaking.

Copolymers of N-vinylcarboxamides and other monoethylenically unsaturated compounds, such as acrylic acid, acrylates, vinyl acetate, N-vinylpyrrolidone or acrylonitrile, are likewise described in the literature, as are the modified copolymers which are obtainable by the action of acids or bases and in which some or all of the carboxamido groups can be eliminated from the polymerized N-vinylcarboxamides and in which the polymerized comonomers may be hydrolyzed, cf. EP-B-0 216 387, EP-B-0 251 182, EP-A-0 528 409, WO-A-82/02073, JP-A-84/033 312, JP-A-84/039 399, EP-A-0 337 310 and DE-A-4 322 854.

Partially or completely hydrolyzed copolymers of N-vinylformamide are used, for example, as dry and wet strength agents in paper-making, as fixatives and as promoters for diketene sizing.

It is an object of the present invention to provide novel substances.

We have found that this object is achieved, according to the invention, by graft polymers which contain N-vinyl units and in which the grafting base is a polymer which contains in each case at least 5% by weight of units of the formulae

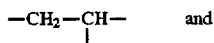 (I)

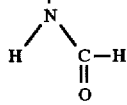

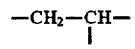 (II)

or is obtainable by polymerizing N-vinylformamide alone or together with other copolymerizable monomers and by hydrolyzing 100 % of the units of the formula I incorporated in the polymer, monoethylenically unsaturated monomers are grafted onto the grafting base in a weight ratio of from 100:1 to 1:100 and the graft polymers have K values of at least 7 (determined according to H. Fikentscher in 5 % strength by weight aqueous solution at 25° C. and pH 7).

The graft polymers containing N-vinyl units are prepared by free radical polymerization of monoethylenically unsaturated monomers in the presence of polymers which contain in each case at least 5% by weight of units of the formulae I and II, as the grafting base, in a weight ratio of from 100:1 to 1:100.

The graft polymers thus obtainable are used as dispersants for pigments, as additives for detergents and cleaning agents, as strength agents for paper, as soil stabilizers and for fertilizer compaction.

The grafting bases used are polymers which contain at least 5% by weight of polymerized units of the formula

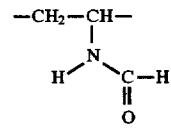 (I)

units of the formula

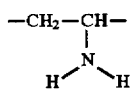 (II)

The units of the formula I are based on N-vinylformamide as the monomer.

For the preparation of polymers, N-vinylformamide may be used alone or together with other copolymerizable monomers. Processes for the preparation of such copolymers are known (cf. the abovementioned publications).

Examples of other suitable copolymerizable monomers are monoethylenically unsaturated carboxylic acids of 3 to 8 carbon atoms, such as acrylic acid, methacrylic acid, dimethacrylic acid, ethacrylic acid, maleic acid, citraconic acid, methylene-malonic acid, allylacetic acid, vinylacetic acid, crotonic acid, fumaric acid, mesaconic acid and itaconic acid. From this group of monomers, acrylic acid, methacrylic acid, maleic acid or mixtures of the stated carboxylic acids, in particular mixtures of acrylic acid and maleic acid or mixtures of acrylic acid and methacrylic acid, are preferably used. The monoethylenically unsaturated carboxylic acids may be used in the form of the free acids and, where available, of the anhydrides, or in partially or completely neutralized form in the copolymerization. These monomers are neutralized using, preferably, alkali metal or alkaline earth metal bases, ammonia or amines, for example sodium hydroxide solution, potassium hydroxide solution, sodium carbonate, potassium carbonate, sodium bicarbonate, magnesium oxide, calcium hydroxide, calcium oxide, gaseous or aqueous ammonia, triethylamine, ethanolamine, diethanolamine, triethanolamine, morpholine, diethylenetriamine or tetraethylenepentamine.

Examples of further suitable comonomers are the esters, amides and nitriles of the abovementioned carboxylic acids, eg. methyl acrylate, ethyl acrylate, methyl methacrylate, ethyl methacrylate, hydroxyethyl acrylate, hydroxypropyl acrylate, hydroxybutyl acrylate, hydroxyethyl methacrylate, hydroxypropyl methacrylate, hydroxyisobutyl acrylate, hydroxyisobutyl methacrylate, mono-methyl maleate, dimethyl maleate, monoethyl maleate, diethyl maleate, 2-ethylhexyl acrylate, 2-ethylhexyl methacrylate, acrylamide, methacrylamide, N-dimethylacrylamide, N-tert-butylacryl-amide, acrylonitrile, methacrylonitrile, dimethylaminoethyl acrylate, dimethylaminoethyl methacrylate, diethylaminoethyl acrylate or diethylaminoethyl methacrylate, and the salts of the last-mentioned monomers with carboxylic acids or mineral acids and the quaternized products.

Acrylamidoglycolic acid, vinylsulfonic acid, allylsulfonic acid, methallylsulfonic acid, styrenesulfonic acid, 3-sulfopropyl acrylate, 3-sulfopropyl methacrylate and acrylamidomethylpropane-sulfonic acid and monomers containing phosphonic acid groups, such as vinylphosphonic acid, allylphosphonic acid and acrylamidomethylpropanephosphonic acid, are also suitable as other copolymerizable monomers.

Further suitable copolymerizable compounds are N-vinylpyrroli-done, N-vinylcaprolactam, N-vinylimidazole, N-vinyl-2-methyl-imidazole, N-vinyl-4-methylimidazole, diallylammonium chloride, vinyl acetate and vinyl propionate. It is of course also possible to use mixtures of the stated monomers.

The copolymers contain at least 5, in general at least 20, particularly preferably at least 50, % by weight of polymerized N-vinylamides.

The copolymers are prepared by known processes, for example solution, precipitation, suspension or emulsion polymerization, using 10 compounds which form free radicals under the polymerization conditions. The polymerization temperatures are usually from 30° to 200° C., preferably from 40° to 110° C. Examples of suitable initiators are azo and peroxy compounds and the conventional redox initiator systems, such as combinations of hydrogen peroxide and compounds having a reducing action, eg. sodium sulfite, sodium bisulfite, sodium formaldehyde sulfoxylate and hydrazine. These systems can, if required, additionally contain small amounts of a heavy metal salt.

The homo- and copolymers have K values of at least 7, preferably from 10 to 250. However, the polymers may have K values of up to 300. The K values are determined according to H. Fikentscher, Cellulose-Chemie, 13 (1932) 58–64 and 71–74, in aqueous solution at 25° C., at concentrations which are from 0.1 to 5%, depending on the K value range (cf. below).

The hydrolyzed copolymers which are to be used according to the invention as the grafting base and contain units of the formulae I and II

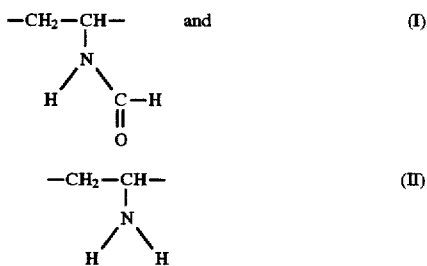

are obtained from the copolymers described above by eliminating some or all of the formyl groups from the N-vinylamides present as polymerized units in the polymer, with formation of amino or ammonium groups.

Depending on the reaction conditions chosen for hydrolysis, either partial or complete hydrolysis of the units I is obtained. The hydrolysis is continued, for example, until from 5 to 100, preferably from 30 to 95, % of the N-vinylamides present as poly-merized units in the polymer have been hydrolyzed. In the hydrolysis of polymers containing vinylformamide units, the degree of hydrolysis can be determined, for example, by polyelectrolyte titration or by enzymatic analysis of the formic acid liberated. Preferably used grafting bases are copolymers of N-vinylformamide and vinyl acetate, acrylic acid, methacrylic acid, acrylamide or acrylonitrile. If copolymers of N-vinylamides are used as the grafting base,, the polymerized comonomers may also be chemically changed, depending on the hydrolysis conditions chosen, for example vinyl alcohol units are formed from vinyl acetate units, acrylic acid units from methyl acrylate units, and acrylamide or acrylic acid units from acrylonitrile units.

Particularly suitable hydrolysis agents are mineral acids, such as hydrogen halides, which may be used in gaseous form or in aqueous solution. Hydrochloric acid, sulfuric acid, nitric acid and phosphoric acid and organic acids, such as $C_1$–$C_5$-carboxylic acids and aliphatic or aromatic sulfonic acids, are preferably used. The pH in the acidic hydrolysis is from −1 to 5, preferably from 0 to 2. From 0.05 to 2, preferably from 1 to 1.5, mol equivalents of an acid are required per equivalent of formyl groups which is to be eliminated from the polymerized units I.

The hydrolysis of the polymerized units of the structure I can also be carried out with the aid of bases, for example metal hydroxides, in particular alkali metal and alkaline earth metal hydroxides. Sodium hydroxide or potassium hydroxide is preferably used. The hydrolysis can, if required, also be carried out in the presence of ammonia or of an amine.

The polymers described above, which contain units of the formula I and/or II, are grafted with monoethylenically unsaturated monomers. The vinylamine units may be present for grafting in free form as amines or as salts thereof.

Grafting can be carried out using all ethylenically unsaturated monomers whose polymerization is not inhibited by the amino groups in free or in salt form. For example, monoethylenically unsaturated mono- and dicarboxylic acids, their salts and esters with $C_1$–$C_{30}$-alcohols, their substituted esters and their amides, N-alkylamides and nitrites are suitable. N-Vinyllactams, N-vinyl-imidazoles and N-vinylamides are also useful, as are sulfo-containing and phosphono-containing monomers. Examples of suitable compounds are acrylic acid, methacrylic acid, dimethylacrylic acid, ethacrylic acid, crotonic acid, vinylacetic acid, allyl-acetic acid, maleic acid, fumaric acid, citraconic acid, mesaconic acid, methylenemalonic acid and itaconic acid, methyl acrylate, ethyl acrylate, methyl methacrylate, ethyl methacry-late, hydroxyethyl acrylate, hydroxypropyl acrylate, hydroxybutyl acrylate, hydroxyethyl methacrylate, hydroxypropyl methacrylate, hydroxyisobutyl acrylate, hydroxyisobutyl methacrylate, mono-methyl maleate, dimethyl maleate, monoethyl maleate, diethyl maleate, 2-ethylhexyl acrylate, 2-ethylhexyl methacrylate, acrylamide, methacrylamide, N-dimethylacrylamide, N-tert-butylacryl-amide, acrylonitrile, methacrylonitrile, dimethylaminoethyl acrylate, dimethylaminoethyl methacrylate, diethylaminoethyl acrylate, diethylaminoethyl methacrylate and the salts of the last-mentioned monomers with carboxylic acids or mineral acids and the quaternized products. Other suitable monomers are acryl-amidoglycolic acid, vinylsulfonic acid, allylsulfonic acid, meth-allylsulfonic acid, styrenesulfonic acid, 3-sulfopropyl acrylate, 3-sulfopropyl methacrylate and acrylamidomethylpropanesulfonic acid and monomers containing phosphonic acid groups, such as vinylphosphonic acid, allylphosphonic acid and acrylamidomethyl-propanephosphonic acid.

Further suitable compounds are N-vinylimidazole, N-vinylpyrroli-done, N-vinylcaprolactam, N-vinyl-2-methylimidazole, N-vinyl-4-methylimidazole, diallylammonium chloride, vinyl acetate and vinyl propionate, N-vinylformamide, N-vinyl-N-methylformamide, N-vinylacetamide, N-vinyl-N-methylacetamide, N-vinyl-N-ethylacet-amide, N-vinylpropionamide and N-vinyl-N-methylpropionamide.

It is of course also possible to use mixtures of the stated monomers, for example mixtures of acrylic acid and vinyl acetate, mixtures of different acrylates, mixtures of acrylates and acry-lamide or mixtures of acrylamide and hydroxyethyl acrylate.

The carboxylic acids, sulfonic acids and phosphonic acids may be used in free form or partially or completely neutralized form in the graft polymerization. For example, alkali metal or alkaline earth metal bases, ammonia or amines, for example sodium hydroxide solution, potassium hydroxide solution, sodium carbonate, potassium carbonate, sodium bicarbonate, magnesium oxide, calcium hydroxide, calcium oxide, ammonia, triethylamine, morpholine, diethylenetriamine or tetraethylenepentamine, are used for neutralizing the monoethylenically unsaturated carboxylic acids.

N-Vinylpyrrolidone, N-vinylcaprolactam, N-vinylimidazole, acrylic acid, methacrylic acid, acrylamide, acrylonitrile and vinyl acetate are preferably grafted onto the grafting base.

For the preparation of the graft copolymers, the monomers are subjected to free radical polymerization in the presence of the grafting base. In some cases, it may be advantageous with regard to the action of the resulting graft polymer to use two or more polymers which contain units of the formulae I and/or II, for example mixtures of hydrolyzed homopolymers of N-vinylformamide and hydrolyzed copolymers of N-vinylformamide and vinyl acetate.

The graft polymerization can be carried out in the presence or absence of inert solvents or inert diluents. Since the polymerization in the absence of inert solvents or diluents generally leads to nonuniform graft copolymers, the graft copolymerization in an inert solvent or diluent is preferred. Examples of suitable inert diluents are those in which the polymers used as the grafting base can be suspended and which dissolve the monomers. In these cases, the graft copolymers are present in suspended form after copolymerization and can readily be isolated in solid form by filtration. Examples of suitable inert diluents are toluene, o-, m- and p-xylene and isomer mixtures, ethylbenzene, aliphatic hydrocarbons, such as pentane, hexane, heptane, octane, nonane, dodecane, cyclohexane, cyclooctane and methylcyclohexane, and mixtures of the stated hydrocarbons or gasoline fractions which contain no polymerizable monomers. Chlorohydrocarbons, such as chloroform, carbon tetrachloride, hexachloroethane, dichloroethane and tetrachloroethane, are also suitable. In the procedure described above, in which the polymers used as the grafting base are suspended in an inert diluent, anhydrous polymers are preferably used and, from the group consisting of the dicarboxylic acids, the anhydrides are preferably employed. A preferred method of preparation of the graft copolymers is solution polymerization, the polymers used as the grafting base, the monomers and the resulting graft copolymer being present at least in dispersed form, preferably in dissolved form. For example, inert solvents, such as methanol, ethanol, isopropanol, n-propanol, n-butanol, sec-butanol, tetrahydrofuran or dioxane, and mixtures of the stated inert solvents are suitable for the solution polymerization. The solution polymerization in water or in a mixture of water and an alcohol is preferred. The graft copolymerization may be carried out continuously or batchwise.

The graft copolymers are generally prepared in the presence of free radical initiators. Preferred free radical initiators are all those compounds which have a half-life of less than 3 hours at the particular chosen polymerization temperature. If the polymerization is first initiated at a lower temperature and completed at a higher temperature, it is advantageous to employ at least two initiators which decompose at different temperatures, ie. initially to use an initiator which decomposes at a lower temperature for initiating the polymerization and then to complete the main polymerization with an initiator which decomposes at a higher temperature. Water-soluble and water-insoluble initiators or mixtures of water-soluble and water-insoluble initiators may be used. The water-insoluble initiators are then soluble in the organic phase. For the temperature ranges stated below, for example, initiators stated for these ranges can be used.

Temperature: from 30° to 60° C.:

acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis-(4-methoxy-2,4-dimethylvaleronitrile), 2,2'-azobis-(2-methyl-N-phenylpropion-amidine) dihydrochlorid and 2,2'-azobis-(2-methylpropionamidine) dihydrochloride.

Temperature: from 60° to 80° C.:

tert-butyl perpivalate, dioctanoyl peroxide, dilauryl peroxide and 2,2'-azobis-(2,4-dimethylvaleronitrile).

Temperature: from 80° to 100° C.:

dibenzoyl peroxide, tert-butyl per-2-ethylhexanoate, tert-butyl permaleate, 2,2'-azobisisobutyronitrile, dimethyl 2,2'-azobisiso-butyrate, sodium persulfate, potassium persulfate and ammonium persulfate.

Temperature: from 100° to 120° C.:

bis(tert-butyl peroxy)-cyclohexane, tert-butyl peroxyisopropyl-carbonate, tert-butyl peracetate and hydrogen peroxide.

Temperature: from 120° to 140° C.:

2,2-bis-(tert-butylperoxy)-butane, dicumyl peroxide, di-tert-amyl peroxide and di-tert-butyl peroxide.

Temperature: >140° C.:

p-menthane hydroperoxide, pinane hydroperoxide, cumene hydroper-oxide and tert-butyl hydroperoxide.

If, in addition to the stated initiators, salts or complexes of heavy metals, for example copper, cobalt, manganese, iron, vana-dium, nickel and chromium salts, or organic compounds, such as benzoin, dimethylaniline or ascorbic acid, are used, the half-lives of the stated free radical initiators can be reduced. For example, tert-butyl hydroperoxide can be activated with the addition of 5 ppm of copper(II) acetylacetonate so that polymerization can be effected at as low as 100° C. The reducing component of redox catalysts may also be formed, for example, by compounds such as sodium sulfite, sodium bisulfite, sodium formaldehyde sulfoxylate and hydrazine. From 0.01 to 20, preferably from 0.05 to 10% by weight, based on the monomers used in the polymerization, of a polymerization initiator or of a mixture of a plurality of polymerization initiators are used. From 0.01 to 15% of the compounds having reducing activity are used as redox components. From 0.1 to 100, preferably from 0.5 to 10, ppm of heavy metals are used. It is often advantageous to use a combination of peroxide, reducing agent and heavy metal as the redox catalyst.

The copolymerization of the monomers in the presence of polymers having units of the formulae I and/or II can also be carried out by the action of ultraviolet radiation, in the presence or absence of UV initiators. For the polymerization under the action of UV radiation, the conventional suitable photoinitiators or sensitizers are used. These are, for example, compounds such as benzoin, benzoin ether, a-methylbenzoin or a-phenylbenzoin. Triplet sensitizers, such as benzil diketals may also be used. UV radiation sources used are, for example, high-energy UV lamps, such as carbon arc lamps, mercury vapor lamps or xenon lamps, as well as low-UV light sources, such as fluorescent tubes, having a large blue component.

In order to prepare graft polymers having a low K value, the graft copolymerization is advantageously carried out in the presence of regulators. Examples of suitable regulators are mercapto compounds, such as mercaptoethanol, mercaptopropanol, mercapto-butanol, mercaptoacetic acid, mercaptopropionic acid, butyl mer-captan and dodecyl mer-captan. Other useful regulators are allyl compounds, such as allyl alcohol, aldehydes, such as formalde-hyde, acetaldehyde, propionaldehyde, n-butyraldehyde and isobutyraldehyde, formic acid, ammonium formate, propionic acid, hy-drazine sulfate and butenols. If the polymerization is carried out in the presence of regulators, from 0.05 to 20% by weight, based on the monomers used in the polymerization, of said regulators are required.

The graft polymerization is usually carried out at from 20° to 200° C., superatmospheric pressure being used if required. The preferred temperature range is, however, from 30° to 120° C.

If the reactions are carried out in solution, concentrations of from 5 to 80% by weight are advantageously chosen. The preferred concentration range is from 10 to 60% by weight. It may sometimes be advantageous to graft the monomers onto the unhydrolyzed polymers, i.e. in this case the polymers contain only the units of the formula I in addition to units of the other monomers which may also be polymerized. After the graft polymerization, the units of the formula I can, if required, be completely or partially hydrolyzed. The conditions for the graft polymerization and for the hydrolysis correspond to those of the methods described above.

The graft polymers have K values of at least 7, determined according to H. Fikentscher in 5% strength by weight aqueous solution at 25° C. and pH 7. The K values of the graft polymers are preferably from 10 to 200, but may be up to 300. As a rule, K values of from 7 to 20 are measured in 5% aqueous solutions, those from 20 to 100 in 1% strength aqueous solutions, those from 100 to 200 in 0.5% strength aqueous solutions and those >200 in 0.1% strength aqueous solutions.

The graft polymers are used, for example, as dispersants for pigments, as additives for detergents and cleaning agents, as strength agents for paper and as soil stabilizers and for fertilizer compaction.

EXAMPLES

Preparation of the grafting bases

Grafting base A 500 g of water, 6.8 g of 75% strength phosphoric acid and 4.2 g 35 of 50% strength aqueous sodium hydroxide solution are initially taken in a reactor. The pH is 6.3. The mixture is then heated to 70° C. in a gentle stream of nitrogen and 638 g of N-vinylformamide and a solution of 12.5 g of 2-mercaptoethanol in 30 g of water are metered in uniformly in the course of 3 hours and a solution of 3.13 g of 2,2'-azobis(2-methylpropionamidine) dihydrochloride in 95 g of water in the course of 4 hours at 70° C. The yellow, clear solution has a solids content of 50.9%. The K value of the polymer is 31.7. 383 g of gaseous hydrogen chloride are then passed in at 70° C., and the mixture is heated for 5 hours at 70° C. until 95% of the formamide structures have been hydrolyzed to amine structures. Dilution is then effected with 3000 g of water, after which the sodium chloride and sodium formate are removed by ultrafiltration. The highly alkaline solution is then concentrated to a polymer content of 42.5 % in a rotary evaporator under reduced pressure.

Grafting base B 750 g of water and 1.5 g of primary sodium phosphate are heated to 68° C. in a gentle stream of nitrogen in a reactor, and 150 g of N-vinylformamide are metered in uniformly in the course of 4 hours and a solution of 0.45 g of 2,2'-azobis (2-methylpropion-amidine) dihydrochloride in 100 g of water in the course of 6 hours at 68° C. Heating is then continued for a further 2 hours at 70° C. The aqueous solution has a polymer content of 15%. The K value of the polymer is 88 (measured as a 1% strength solution 15 in water). 93 g of hydrogen chloride are then passed into the polymer solution at 70° C. in the course of about 30 minutes, after which heating is continued for a further 5 hours at 70° C. until more than 95% of the formamide groups have been hydrolyzed to vinylamine groups. The solution is then cooled and its pH is brought to 4.5 with 50% strength sodium hydroxide solution. The polyvinylamine content is 11.3%, said content being in the form of the hydrochloride.

Example 1

In a stirred reactor having a nitrogen feed, reflux condenser and metering apparatuses, 400 g of the 42.5% strength solution of grafting base A, 80 g of water and 59 g of acetic acid are heated to 85° C. in a gentle stream of nitrogen. The solution has a pH of 30 8.5. At 85° C, a mixture of 180 g of N-vinylpyrrolidone and 40 g of water is metered in uniformly in the course of 3 hours and a solution of 1.8 g of 2,2'-azobis(2-methylpropionamidine) dihydrochloride in 50 g of water is metered in uniformly in the course of 4 hours. Heating is then continued for a further 2 hours at 35 85° C. During cooling, dilution is effected with 250 g of water. The clear yellow viscous solution has a solids content of 34.9% and a pH of 9.0. The K value of the polymer is 62, measured as a 1% strength solution in water.

Example 2

In a reactor according to Example 1, 265.5 g of the 42.5% strength solution of grafting base A, 214.5 g of water and 180 g of N-vinylimidazole are heated to 100° C. while gently boiling. A solution of 3.6 g of 2,2'-azobis(2-methylpropionamidine) dihy-drochloride in 90 g of water is metered in at 100° C. in the course of 6 hours. Heating is then continued for a further 1 hour at 100° C., dilution is effected with 750 g of water and the mixture is cooled. The pale brown, clear solution has a solids content of 20% and a pH of 10.6. The K value of the polymer is 44, measured as a 1% strength solution in water.

Example 3

Example 2 is repeated, except that the initially taken mixture is brought to a pH of 7.5 with 70 g of acetic acid and diluted with 250 g of water at the end. The brown, clear solution has a solids content of 32.6% and a pH of 8.0. The K value of the polymer is 66, measured as a 1% strength solution in water.

Example 4

In a reactor according to Example 1, 331.8 g of the 42.5% strength solution of grafting base A and 257.3 g of water are heated to 85 C in a gentle stream of nitrogen. A mixture of 225 g of methacrylic acid, 167 g of water and 184 g of 50% strength 20 sodium hydroxide solution and a solution of 2.25 g of 2,2'-azo-bis(2-methylpropionamidine) dihydrochloride in 83 g of water are metered in uniformly in the course of 3 hours, the sodium hydroxide solution being added slowly to the methacrylic acid solution at not more than 30° C. Heating is then continued for a further hour at 85° C. After cooling, the polymer is present as a pale brown, slightly cloudy 34.2% strength solution having a pH of 11.0. The K value of the polymer is 68, measured as a 1% strength solution in water.

Example 5

In a reactor according to Example 1, 265.5 g of the 42.5% strength solution of grafting base A and 324.5 g of water are heated to 85° C. in a gentle stream of nitrogen. 360 g of the 50% strength solution of acrylamide are metered in uniformly in the course of 3 hours, and a solution of 1.8 g of 2,2'-azobis(2-methylpropionamidine) dihydrochloride in 50 g of water in the course of 4 hours. The reaction mixture is polymerized for a further 2 hours at 85° C. and then cooled. The clear, brown, viscous solution has a solids content of 30% and a pH of 10.4. The K value of the polymer is 27 (measured as a 1% strength solution in water).

Example 6

Example 5 is repeated, except that the initially taken mixture is brought to a pH of 6.7 with 81 g of acetic acid. The clear brown viscous solution has a solids content of 35.6% and a pH of 6.6. The K value of the polymer is 53.

Example 7

In a reactor according to Example 1, 331.8 g of a 45% strength solution of grafting base A and 257.3 g of water are heated to 85° C. in a gentle stream of nitrogen. A solution of 225 g of acrylic acid, 267 g of water and 250 g of 50% strength sodium hydroxide solution (maximum neutralization temperature 30° C.) and a solution of 2.25 g of 2,2'-azobis(2-methylpropionamidine) dihydro-chloride in 83 g of water are metered in uniformly in the course of 3 hours. The reaction mixture is then heated for a further hour at 85° C. The brown, slightly cloudy solution has a pH of 11.5 and a solids content of 32.1%. The K value of the polymer is 88.

Example 8

In a reactor according to Example 1, 548 g of water, 0.145 g of sodium hexametaphosphate, 0.05 g of the 40% strength aqueous solution of the pentasodium salt of diethylenetriaminepentaacetic acid, 56.5 g of the 42.5% strength solution of grafting base A, 15 g of acetic acid and 112 g of a 50% strength aqueous acryla-mide solution are heated to 50° C. in gentle stream of nitrogen. A solution of 0.017 g of 2,2'-azobis(2-methylpropionamidine) dihy-drochloride in 13.34 g of water is added immediately, and this addition is repeated after 1 hour and after 3 hours. After a further 2 hours in each case, a solution of 0.084 g of 2,2'-azo-bis(2-methylpropionamidine) dihydrochloride in 13.34 g of water is added and heating is continued for a further 2 hours at 75° C. The yellow, clear solution has a solids content of 11.5% and a pH of 6.8. The K value of the polymer is 78 (measured as a 1% strength solution in water).

Example 9

Example 8 is repeated, except that 40 g of 32% strength hydro-chloric acid are used instead of 15 g of acetic acid, the pH initially being 4.3.

The yellow clear polymer solution has a solids content of 11.5% and a pH of 4.8. The K value of the polymer is 86 (measured as a 1% strength solution in water).

Example 10

In a reactor according to Example 1, 437.3 g of water, 0.145 g of sodium hexametaphosphate, 0.04 g of the 40% strength solution of the pentasodium salt of diethylenetriaminepentaacetic acid, 141.6 g of the 11.3% strength solution of grafting base B, 128 g of a 50% strength aqueous acrylamide solution and 5 g of acetic acid are initially taken. The pH of the mixture is 4.5. The initially taken mixture is then heated to 50° C. in a gentle stream of nitrogen. As soon as the temperature of 50° C. is reached, and after 2 hours, a solution of 0.019 g of 2,2'-azobis(2-methylpropionami-dine) dihydrochloride is added. Heating is then continued for a further 2 hours at 75° C. The yellowish clear solution has a solids content of 13.9% and a pH of 4.6. The K value of the polymer is 84 (measured as a 1% strength solution in water).

We claim:

1. A graft polymer containing N-vinyl units comprising a grafting base which is a polymer which contains least 5% by weight of each of the units of the formulae

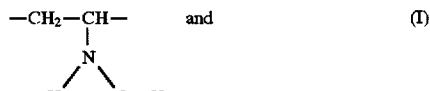

and monoethylenically unsaturated monomers grafted in a weight ratio of monoethvlenicallv unsaturated monomers to the grafting base of from 100:1 to 1:100 onto the grafting base and the graft polymer has a K value of at least 7 (determined according to H. Fikentscher in 5% strength by weight aqueous solution at 25° C. and pH 7).

2. A process for the preparation of a graft polymer containing N-vinyl units, as claimed in claim 1, which comprises subjecting monoethylenically unsaturated monomers to free radical polymerization in the presence of a polymer which contains at least 5% by weight of each of the units of the formulae I and II. as the grafting base, in a weight ratio of monoethvlenicallv unsaturated monomers to the grafting base of from 100:1 to 1:100.

3. A process as claimed in claim 2. wherein the grafting base contains at least 20% by weight of each of the units of the formulae I and II.

4. A process as claimed in claim 2, wherein the grafting base contains from 5 to 70% of units of the formula I and from 30 to 95% by weight of units of the formula II.

5. A process as claimed in claim 2, wherein the grafting base contains from 5 to 40% by weight of units of the formula I and from 60 to 95% by weight of units of the formula II.

6. A process as claimed in claim 2, wherein the grafting base is a copolymer of N-vinylformamide and vinyl acetate, acrylic acid, methacrylic acid, acrylamide or acrylonitrile.

7. A process as claimed in claim 2, wherein the monethylenically unsaturated monomers are selected from the group consisting of N-vinylpyrrolidone, N-vinylcaprolactam, N-vinylimidazole, acrylic acid, methacrylic acid, acrylamide, acrylonitrile and vinyl acetate.

8. A graft polymer as claimed in claim 1, wherein the grafting base is a hydrolyzed copolymer of N-vinylformamide and vinyl acetate, acrylic acid, methacrylic acid, acrylamide or acrylonitrile.

9. A graft polymer as claimed in claim 1, wherein the monoethylenically unsaturated monomers are selected from the group consisting of N-vinylpyrrolidone, N-vinylcaprolactam, N-vinylimidazole, acrylic acid, methacrylic acid, acrylamide, acrylonitrile and vinyl acetate.

10. A graft polymer as claimed in claim 1, wherein the grafting base is a hydrolyzed copolymer of N-vinylformamide and vinyl acetate, acrylic acid, methacrylic acid, acrylamide or acrylonitrile and the monoethylenically unsaturated monomers are selected from the group consisting of N-vinylpyrrolidone, N-vinylcaprolactam, N-vinylimidazole, acrylic acid, methacrylic acid, acrylamide, acrylonitrile and vinyl acetate.

* * * * *